(12) United States Patent
Roth et al.

(10) Patent No.: US 8,327,694 B2
(45) Date of Patent: Dec. 11, 2012

(54) METHOD FOR ADAPTING MECHANICAL TOLERANCES OF A TIMING WHEEL

(75) Inventors: Andreas Roth, Muehlacker-Lomersheim (DE); Armin Huber, Ostfildern (DE); Jens Boettcher, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 116 days.

(21) Appl. No.: 12/735,783

(22) PCT Filed: Nov. 19, 2008

(86) PCT No.: PCT/EP2008/065836
§ 371 (c)(1),
(2), (4) Date: Nov. 1, 2010

(87) PCT Pub. No.: WO2009/103367
PCT Pub. Date: Aug. 27, 2009

(65) Prior Publication Data
US 2011/0036156 A1 Feb. 17, 2011

(30) Foreign Application Priority Data
Feb. 20, 2008 (DE) .......................... 10 2008 010 102

(51) Int. Cl.
G01M 15/06 (2006.01)
(52) U.S. Cl. ................................. 73/114.26; 73/114.25
(58) Field of Classification Search ... 73/114.25–114.28
See application file for complete search history.

(56) References Cited

U.S. PATENT DOCUMENTS

| 5,428,991 | A | 7/1995 | Klenk et al. |
| 6,590,299 | B2 * | 7/2003 | Kuang et al. ................. 290/40 C |
| 6,857,491 | B2 * | 2/2005 | Wakashiro et al. ......... 180/65.26 |
| 7,610,800 | B2 * | 11/2009 | Avallone et al. ........... 73/114.26 |
| 7,921,705 | B2 * | 4/2011 | Hamama et al. ........... 73/114.68 |
| 2002/0112903 | A1 | 8/2002 | Wakashiro et al. |
| 2007/0073466 | A1 * | 3/2007 | Tamai et al. .................... 701/70 |
| 2007/0191181 | A1 | 8/2007 | Burns |
| 2009/0056429 | A1 * | 3/2009 | Avallone et al. ........... 73/114.26 |

FOREIGN PATENT DOCUMENTS

| DE | 44 06 606 | 9/1995 |
| EP | 1 757 946 | 2/2007 |
| WO | 93/07497 | 4/1993 |

* cited by examiner

Primary Examiner — Freddie Kirkland, III
(74) Attorney, Agent, or Firm — Kenyon & Kenyon LLP

(57) ABSTRACT

Disclosed is a method for adapting mechanical tolerances of a timing wheel of a sensor unit of an internal combustion engine of a hybrid drive of a vehicle, the hybrid drive having at least one second motor, in particular an electric motor, in addition to the internal combustion engine, and the internal combustion engine being operated in a desired operating mode during adaptation operation. It is provided that the desired operating mode is performed in such a way that the internal combustion engine is driven using the second motor, in particular an electric motor, and no fuel is supplied to the internal combustion engine. A corresponding device is also disclosed.

7 Claims, 2 Drawing Sheets

METHOD FOR ADAPTING MECHANICAL TOLERANCES OF A TIMING WHEEL

FIELD OF THE INVENTION

The present invention relates to a method for adapting mechanical tolerances of a timing wheel of a sensor unit of an internal combustion engine of a hybrid drive of a vehicle.

BACKGROUND INFORMATION

Sampling a timing wheel, on whose surface markings are applied, and which is situated rotationally fixed on the relevant shaft, is known for detecting a specific position of a shaft, such as the crankshaft or the camshaft of an internal combustion engine. The sampling is performed using an inductive pickup or using a Hall sensor, for example, in which voltage pulses are induced by the passing markings, which are processed in a connected analysis circuit or a connected control unit, the speed of the shaft being calculated from the time intervals of the voltage pulses. These known apparatuses have the disadvantage that the angle marks must either be executed very exactly, so that the intervals between equivalent angle mark flanks are very precise, or the establishment of the speed may only be performed imprecisely.

Therefore, a method is discussed in International Patent Document WO 93/07497 for adapting mechanical tolerances of such a timing wheel, i.e., irregularities in the intervals of the angle marks. For this purpose, in overrun operation, in particular in overrun cut-off operation of an internal combustion engine of the motor vehicle, an adaptation is performed, in that in the case of recognized overrun operation, the second and the following time intervals to the first time interval, as recorded by the timing wheel, are set in relation to one another. It is disadvantageous therein that this method may only be used in conventional internal combustion engines, because overrun cut-off operation of the internal combustion engine is required for this purpose. Such operation occurs much more rarely in hybrid vehicles. It may thus take a relatively long time until an adaptation of this type may be performed; non-adapted states may occur in the intermediate time.

An object of the exemplary embodiments and/or exemplary methods of the present invention is to provide such an adaptation of mechanical tolerances of the timing wheel even outside overrun cut-off phases of the internal combustion engine.

SUMMARY OF THE INVENTION

For this purpose, a method is proposed for adapting mechanical tolerances of a timing wheel of a sensor unit of an internal combustion engine of a hybrid drive of a vehicle, the hybrid drive having at least one second motor, in particular an electric motor, in addition to the internal combustion engine and the internal combustion engine being operated in a desired operating mode during adaptation operation. It is provided that the desired operating mode is performed in such a way that the internal combustion engine is driven using the second motor, in particular an electric motor, and no fuel is supplied to the internal combustion engine. In contrast to the related art, the operating mode of overrun cut-off is not used for the adaptation. It is possible to also use overrun cut-off operation, however, this is not exclusively provided according to the exemplary embodiments and/or exemplary methods of the present invention. Rather, it is solely necessary for the internal combustion engine to be operated consistently, so that the timing wheel has a consistent speed. For this purpose, it must be ensured that influences which are actually to be uncovered by the device to be adapted, such as running irregularities, which indicate ignition misfires, are excluded. For this reason, the internal combustion engine is not driven by its own power to perform the adaptation. Accordingly, a state must prevail in which the internal combustion engine is rotated further with the gasoline supply shut down, for example, in a suitable driving state. This is the case, for example, if the internal combustion engine is driven by the second motor of the hybrid vehicle. The drive by the second motor, in particular an electric motor, allows a uniform speed to be introduced into the internal combustion engine. If time deviations of the periodic sequences of the timing wheel are accordingly established, it may be concluded that they originate from tolerances of the timing wheel, and not from varying speed of the internal combustion engine. Such an operation is possible when the vehicle is stationary, for example, if drive power is not required for movement of the vehicle, for example, during startup of the vehicle, in a traffic jam, or in a workshop during maintenance. This method may already be performed particularly advantageously during manufacturing of the vehicle, for example, on the production line or when leaving the production line in a final test phase. It is solely decisive that the electrical drive, thus in particular the electric motor of the hybrid drive, may entrain the unfueled internal combustion engine. The adaptation may be performed for this purpose by programmed requests, for example, or also by a targeted tester selection, i.e., by human influence.

According to a further embodiment of the method, the second motor, in particular an electric motor, drives the vehicle during the selected operating mode. Such a suitable driving state is provided if driving is possible using this second motor and the second motor has adequate torque reserve to be able to also entrain the unfueled internal combustion engine in addition to fulfilling the driver command. The internal combustion engine is thus also driven in addition to the driving performances commanded by the driver, which the second motor of the hybrid drive is to perform.

In an exemplary embodiment of the method, the timing wheel is driven by the crankshaft of the internal combustion engine. Timing wheels of this type may be driven by crankshafts, for example, by a direct coupling and rotationally fixed connection to the crankshaft.

According to a further embodiment of the method, a timing wheel having at least one segment is employed, which is used for contactless sampling via a sensor of a sensor unit. The timing wheel accordingly has at least one segment, which is sampled in a contactless manner by a sensor of a sensor unit via the cyclic revolution of the timing wheel. Rotational irregularities are detected as a change of the period duration and analyzed, as known from the cited related art.

Furthermore, a device for executing an adaptation of mechanical tolerances of a timing wheel of a sensor unit of an internal combustion engine of a hybrid drive of a vehicle is proposed, the hybrid drive having at least one second motor, in particular an electric motor, in addition to the internal combustion engine, and the internal combustion engine being operated in a desired operating mode during adaptation operation. For this purpose, it is provided that the device has control electronics for operating mode recognition and operating mode selection for initiating and executing the method for adaptation, in particular as already described above. The adaptation is accordingly initiated as a function of the existence of the desired operating mode of the internal combustion engine, for which purpose the control electronics recognize the particular desired operating mode and, as a function of the result of this operating mode recognition, selects a specific operating mode in order to initiate the method for adaptation. Specifically, in particular if running irregularities because of the internal combustion engine are to be ruled out, a reliable adaptation of the timing wheel is possible, as already described above. For this purpose, upon the existence of specific operating modes, in particular, for example, as a function of load states, a state of the internal combustion engine is produced in which the adaptation may be executed free of running irregularities because of the internal combustion engine, and recognized running irregularities are accordingly also actually to be attributed to irregularities or deviations of the timing wheel, which are to be adapted.

In a specific embodiment, these control electronics are integrated into the engine and/or vehicle control electronics or assigned thereto. In particular, a configuration in connection with known control units comes into consideration as particularly advantageous, the control electronics are particularly may be implemented in such a control unit.

In a further specific embodiment, the control electronics have at least one interface for interaction with an operator and/or at least one test device. Through these interfaces, the adaptation of the timing wheel may be performed arbitrarily, in particular at operator request, for example, by the driver or by service personnel. In addition, the interface may also be provided to at least one test device, in particular one which is used for analyzing error states of the vehicle, such as a diagnostic computer.

In a further, particularly specific embodiment, the device has a drive clutch, which makes the engine, which is connected in a rotationally fixed manner to the timing wheel, drivable by the second motor, in particular an electric motor.

A drive clutch is understood here as a rotationally fixed connection, which is not necessarily but advantageously detachable, between the engine and the second motor, in particular an electric motor, the connection allowing the engine to be driven by the second motor, in particular an electric motor, whenever it is not driven under its own power. The second motor thus takes over the drive of the engine via the drive clutch for this purpose, the engine not being in operation itself, i.e., in particular not being supplied with fuel and not being ignited. It may be ensured by this drive clutch that the second motor only drives the engine when the adaptation is to be performed; for example, if the movement of the vehicle is only caused using the second motor during operation, it is not necessary to also rotate the non-driven engine, because this would mean unnecessary power consumption. The engine is accordingly only also driven by the second motor whenever an adaptation as described above is to be performed. Of course, specific embodiments are conceivable in which the drive clutch is implemented as rigid, i.e., not detachable. These are entirely sufficient for engines which are easy to crank and for simpler applications under specific conditions.

Further advantageous specific embodiments result from the description herein and from combinations thereof.

The exemplary embodiments and/or exemplary methods of the present invention is explained in greater detail hereafter on the basis of a method flow chart.

DETAILED DESCRIPTION

Figure 1:
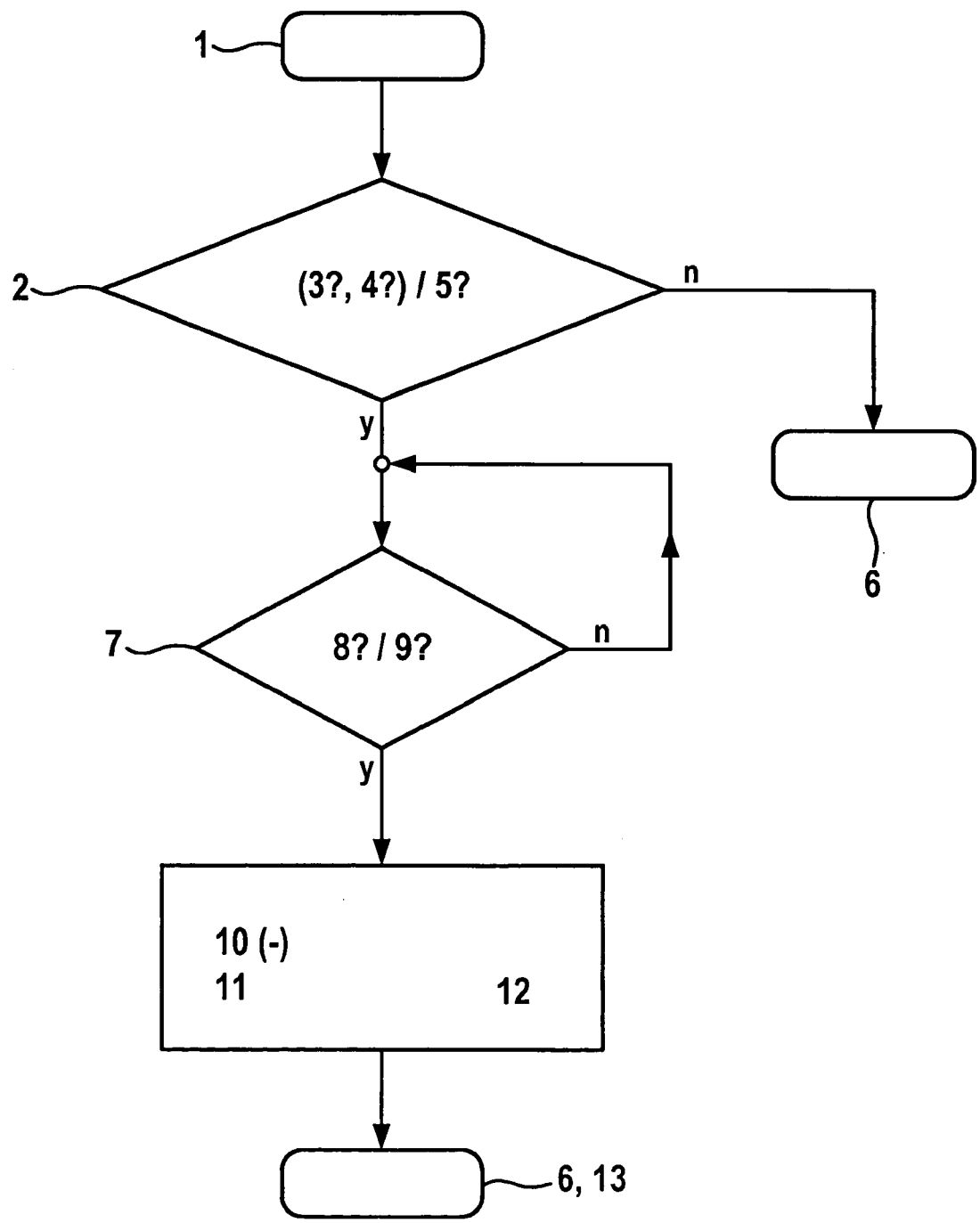
FIG. 1 shows a method sequence of a fuel-off adaptation.

FIG. 1 shows an exemplary embodiment of a method for adapting mechanical tolerances of a timing wheel of a sensor unit of an internal combustion engine having a hybrid drive, namely method initiation in the case of a specific driving status. After a method start 1, it is checked in a test step 2 whether an adaptation of the timing wheel is necessary as a so-called fuel-off adaptation 3, i.e., whether a necessity 4 for adaptation exists, or whether a tester request 5 exists, i.e., whether an arbitrary adaptation is desired, for example, requested by a service technician or by the driver himself. If neither is the case, the method is ended in an ending step 6. If it is the case, it is checked in a driving state check step 7 whether an operating mode 8 suitable for fuel-off adaptation 3 exists, in particular a suitable driving state 9. If not, the method branches back to driving state check step 7. If so, injection unit 10 of the internal combustion engine is shut down and adaptation algorithm 11 is started or, if injection unit 10 is already shut down, adaptation algorithm 11 is started. Detection and analysis steps are performed for this purpose, as are known from the related art, for example, and are therefore not explained separately. Fundamentally, it is assumed in the case of existing smooth running (namely by the flywheel mass in connection with the action of the electric drive) that all intervals between equidistant angle marks of the timing wheel must be of equal size; a deviation measured in this case may therefore be used for correction purposes of the mechanical deviations, i.e., the adaptation, for the angle marks. For this purpose, the angle marks are detected and their segment deviations are calculated. For example, after completion of one camshaft revolution, i.e., after the completion of two revolutions of the crankshaft, the actual calculation is performed, the segment deviations being related to the first segment, for example. This actual adaptation method, in particular the mathematical calculation, is known and therefore does not require further explanation here. The acquired values are then analyzed in an analysis and storage step 12, which uses adaptation algorithm 11, and stored for further use in a suitable manner. The method is ended in an ending step 6, namely adaptation ending step 13.

Figure 2:
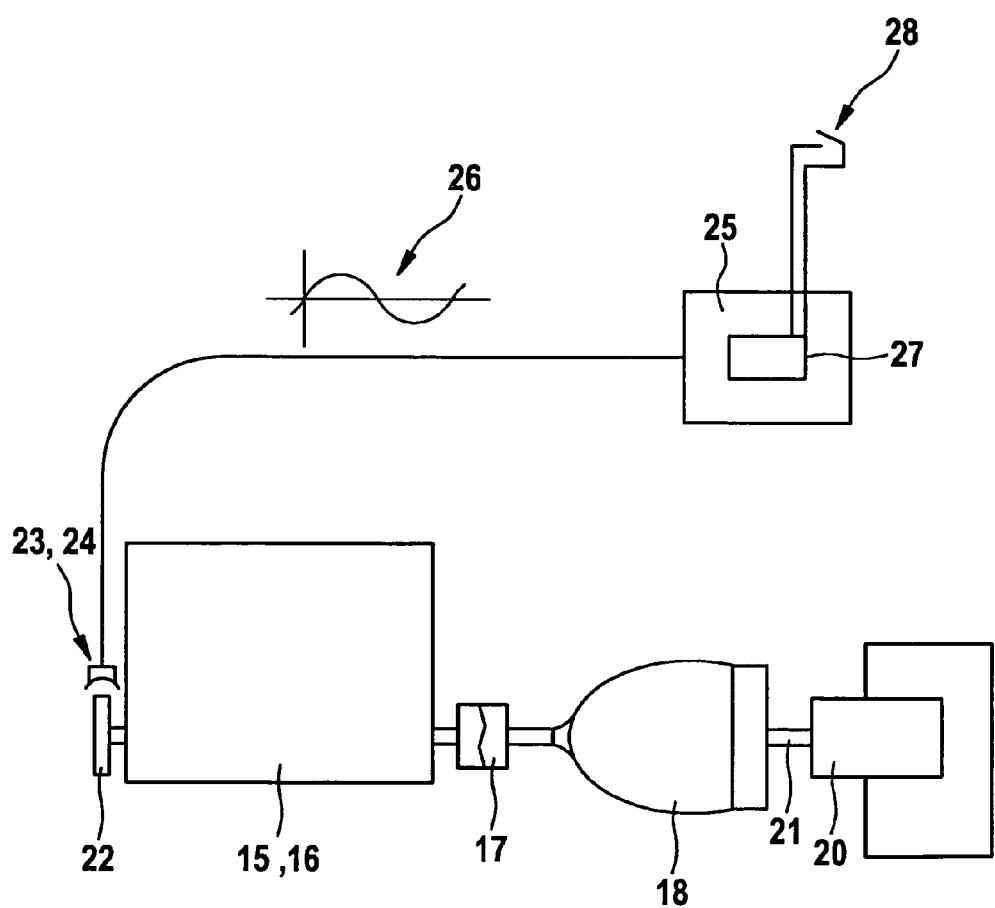
FIG. 2 shows a device for executing the method.

FIG. 2 shows a hybrid drive 14 of a vehicle (not shown), namely a motor vehicle (not shown). Hybrid drive 14 has an engine 15, namely an internal combustion engine 16, which is connectable in a rotationally fixed manner via a detachable drive clutch 17 to a second motor 18, namely an electric motor 19. A transmission 20 for driving wheels (not shown) of the vehicle is situated downstream from second motor 18 in a drivetrain 21, which includes engine 15, drive clutch 17, and second motor 18. On the side of engine 15 diametrically opposite to second motor 18, in extension of drivetrain 21, for example, in extension of a crankshaft (not shown) of engine 15, the vehicle has a timing wheel 22, which is connected in a rotationally fixed manner thereto, and a pickup 23 assigned to timing wheel 22, such as a Hall sensor 24, which is electronically/electrically connected to engine and/or vehicle control electronics 25 for analyzing pulse sequences 26, which are recorded by the pickup and describe the rotation of timing wheel 22. Engine and/or vehicle control electronics 25 are electrically connected to further components (not shown here), in particular the mixture formation unit, the electrical control unit, and further vehicle units for controlling and regulating the operation of the vehicle and the operating modes of engine 15 and second motor 18. Engine and/or vehicle control electronics 25 have control electronics 27 for this purpose, which are integrated in particular into engine and/or vehicle control electronics 25. An interface 28 is connected thereto and/or to engine and/or vehicle control electronics 25, and may be used by an operator (not shown), such as service personnel, to influence and/or analyze the behavior of control electronics 27 and/or engine and/or vehicle control electronics 25. Control electronics 27 are used for recognizing operating modes and for operating mode selection and for initiating and executing the above-described method for adapting rotational irregularities of timing wheel 22. For this purpose, control electronics 27 are alternately connected or connectable to further pickups (not shown here) for operating states of the vehicle (not shown); control electronics 27 may automatically recognize the presence of suitable operating modes which require the method and/or are desired by the operator from data of the engine and/or vehicle control electronics 25. For example, if an adaptation is requested via interface 28, for example, when the vehicle is at a standstill in case of service, second motor 18 is operated, while in contrast engine 15 is shut down. Accordingly, it is not supplied with fuel and is not ignited, but rather is cranked by second motor 18 drive clutch 17, which is engaged in a rotationally fixed manner. Second motor 18 may be implemented as an electric motor 19 for this purpose, which introduces a uniform speed and a uniform torque into engine 15, so that recognized rotational irregularities may be interpreted as irregularities of timing wheel 22, which are to be adapted.

In other constructions, of course, second motor 18, transmission 20, and engine 15 may be situated differently relative to one another, in particular with respect to the ability to disengage via drive clutch 17 and connect to remaining drivetrain 21.

What is claimed is:

1. A method for adapting mechanical tolerances of a timing wheel of a sensor unit of an internal combustion engine of a hybrid drive of a vehicle, the hybrid drive having at least one second motor, which is an electric motor, in addition to the internal combustion engine, the method comprising:
    operating the internal combustion engine in a desired operating mode during an adaptation operation, wherein the desired operating mode is performed so that the internal combustion engine is driven using the second motor, which is the electric motor, and no fuel is supplied to the internal combustion engine;
    wherein the second motor is connectable to the internal combustion engine in a rotationally fixed manner by a drive clutch.

2. The method of claim 1, wherein the second motor, in particular an electric motor, drives the vehicle during the desired operating mode.

3. The method of claim 1, wherein the timing wheel is driven by the crankshaft of the internal combustion engine.

4. The method of claim 1, wherein a timing wheel having at least one segment is used for contactless sampling via a sensor of a sensor unit.

5. A device for executing an adaptation of mechanical tolerances of a timing wheel of a sensor unit of an internal combustion engine of a hybrid drive of a vehicle, the hybrid drive having at least one second motor, which is an electric motor, in addition to the internal combustion engine, comprising:
    a control electronic arrangement for providing operating mode recognition and operating mode selection for initiating and executing an adaptation operation, and having an adapting arrangement to operate the internal combustion engine in a desired operating mode during the adaptation operation, wherein the desired operating mode is performed so that the internal combustion engine is driven using the second motor, which is the electric motor, and no fuel is supplied to the internal combustion engine; and
    a drive clutch, which makes the engine, which is connected in a rotationally fixed manner to the timing wheel, drivable by the second motor.

6. The device of claim 5, wherein the control electronics are integrated into at least one of the engine control electronics and the vehicle control electronics or assigned thereto.

7. The device of claim 5, wherein the control electronics have at least one interface for interaction with at least one of an operator and at least one test device.

* * * * *